A. E. MUELLER.
SPRING MOUNTING FOR VEHICLES.
APPLICATION FILED JULY 22, 1916.
1,228,470.
Patented June 5, 1917.
2 SHEETS—SHEET 1.
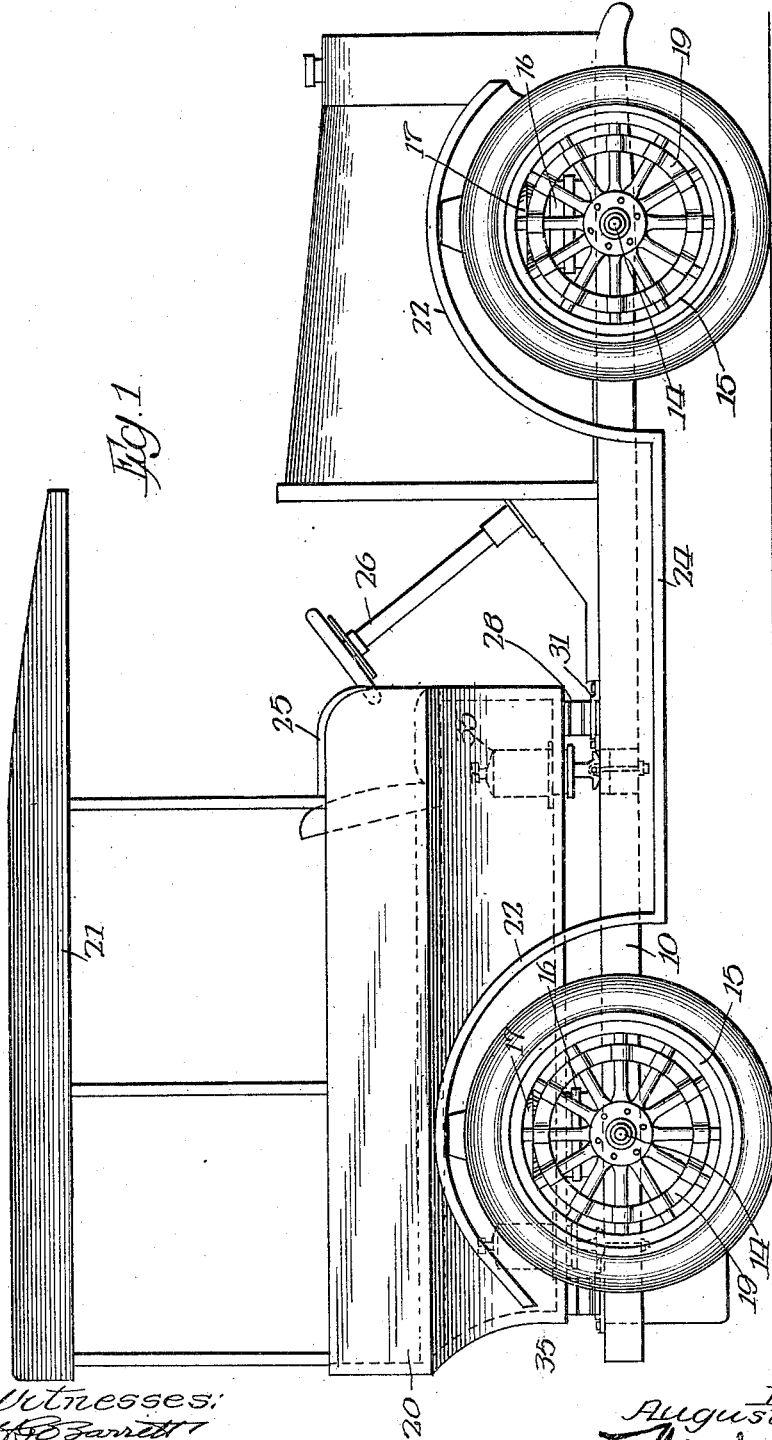

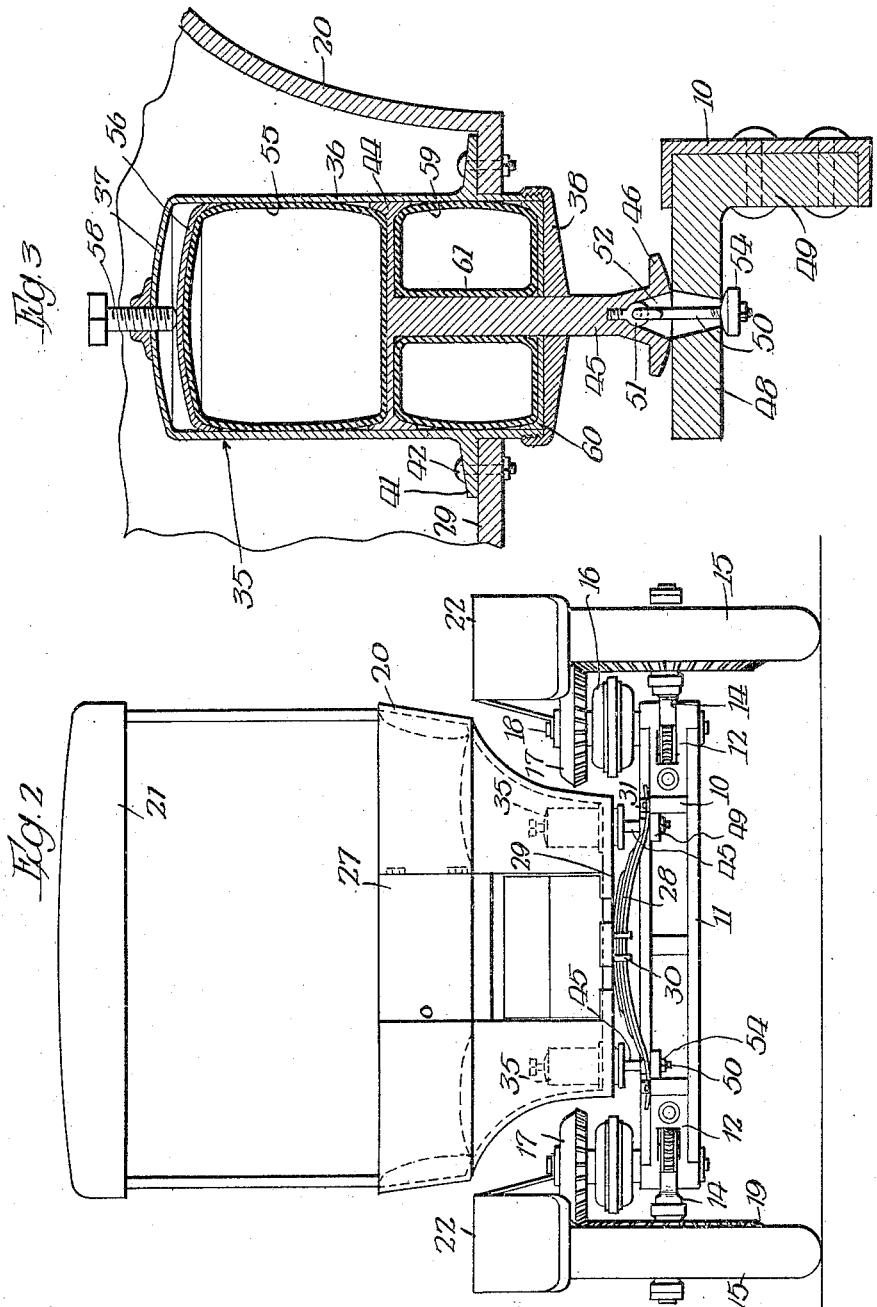

UNITED STATES PATENT OFFICE.

AUGUST E. MUELLER, OF CHICAGO, ILLINOIS, ASSIGNOR OF ONE-THIRD TO THOMAS J. HRUBY AND ONE-THIRD TO JOHN O. HRUBY, JR., BOTH OF CHICAGO, ILLINOIS.

SPRING-MOUNTING FOR VEHICLES.

1,228,470.  Specification of Letters Patent.  Patented June 5, 1917.

Application filed July 22, 1916. Serial No. 110,641.

*To all whom it may concern:*

Be it known that I, AUGUST E. MUELLER, a citizen of Argentina, South America, and a resident of Chicago, in the county of Cook and State of Illinois, have invented certain new and useful Improvements in Spring-Mountings for Vehicles; and I do hereby declare that the following is a full, clear, and exact description thereof, reference being had to the accompanying drawings, and to the characters of reference marked thereon, which form a part of this specification.

This invention relates to improvements in spring mountings for vehicles and refers more particularly to an improved spring mounting between a vehicle body and an unsprung chassis. The invention consists in the combination and arrangement of the parts shown in the drawings and described in the specification, and is pointed out in the appended claims.

Among the objects of the invention is to provide an improved spring mounting by which a vehicle body may be detachably supported on the chassis through the medium of spring devices which impart smooth riding qualities to the body and which is so constructed and arranged as to permit the body and springs to be readily removed from the chassis so that the chassis may be employed for carrying loads of other kinds, or may be employed as a tractor for drawing trailing loads. My improvements are shown as adapted to the type of motor vehicle disclosed in my pending application for Letters Patent of the United States, Serial No. 110,642, filed on the 22nd day of July, 1916, but may be adapted to other constructions.

As shown in the drawings:—

Figure 1 is a side view of a motor vehicle embodying my invention.

Fig. 2 is a rear view thereof.

Fig. 3 is an enlarged axial section of the recoil and cushioning spring and parts associated therewith.

The chassis of the vehicle comprises side members 10, 10 and end members or axle frames 11 rigidly fixed thereto and provided at their ends with castings 12 in which are mounted to swing horizontally stub axles 14 on which are rotatively mounted wheels 15. As in the construction shown in my aforesaid pending application, the vehicle wheels are driven by a plurality of motors 16, one for each wheel, through the medium of gears 17 fixed to the motor shafts 18 and meshing with annular gears 19 carried by said wheels. Said stub shafts may be connected to the type of steering gear shown in my aforesaid pending application by which to steer or direct the vehicle in its course. 20 designates the vehicle body. It may be provided with any suitable form of top 21. Said body is also equipped with the usual form of fenders 22 shown as connected by running boards 24. The body is supported principally over the rear wheels of the vehicle. It is provided at its front end with a driver's seat 25 adjacent to the usual steering post 26. As herein shown, the body is entered at its rear end, being provided with a rear door 27.

The body is supported on the chassis through the medium of front and rear semi-elliptic springs 28. Said springs are fastened to the bottom 29 of the body centrally thereof by means of any suitable form of spring clips 30. Said springs extend transversely between and across the side members 10 of the chassis and are supported at their ends thereon. They are confined on said side members by means of looped clips 31, which are removably fastened to the upper flanges of the channel shaped side members of the chassis, as by means of bolts or other detachable fastening means.

In addition to the springs 28, the body is sustained on the chassis through the medium of a plurality of auxiliary spring or shock absorbing devices designated as a whole by 35, and shown in detail in Fig. 3. Each of said auxiliary springs or shock absorbing devices comprises a vertical casing 36, preferably cylindric, which is closed by a top head 37 and is provided with a removable, centrally apertured bottom head 38. The casing is herein shown as attached to the bottom 29 of the vehicle by means of a flange or lugs 41 and bolts 42. 44 designates a plunger which reciprocates in said cylinder and is provided with a stem 45 which extends downwardly through the apertured bottom head 38 and is formed at its lower end to constitute a shoe 46 that rests on the horizontal arm 48 of a bracket 49 that is bolted or otherwise rigidly secured to the side member of the chassis. As herein shown, four of such auxiliary spring or shock absorbing devices are provided and four brackets 49 extend inwardly from the side members of the chassis, two at each end of the body.

The said stems 45 of the plungers 44 are loosely connected to the horizontal arms of the brackets 49 by means which permit the shoes at the lower ends of the stems to rock on said horizontal arms. As herein shown, this connection is afforded by means of bolts 50 which are loosely connected at their upper ends to eyes 51 anchored in any suitable manner in concave recesses 52 formed in the lower end of the stems, and nuts 54 screw-threaded to said bolts 50 and bearing against the lower faces of the bracket arms 48.

Arranged between said plungers 44 and the upper and lower ends of the casings 36 are cushioning elements, the upper ones of which act auxiliary to the main springs to support the weight of the body and its load, and the lower ones of which serve to prevent recoil of the body under the recoil action of the spring mounting. As herein shown, said cushioning elements are pneumatic cushions. The upper cushions 55 occupy the spaces between the plungers and follower plates 56 which are borne upon by adjusting screws 58 that are screw threaded to the upper heads 37 of the casings. The lower pneumatic cushions 59 are interposed between said plungers and apertured lining plates 60 that rest upon the bottom heads 38 of the casings. Said lower cushions are provided with axial openings for the passage of the stems 45, the walls 61 of said openings being integral with the top and bottom walls of the cushions.

In the use of the device, the main springs 28 have sliding movement on the side members of the chassis in the loops or clips 31, and the weight of the body and its load is distributed among the front and rear springs 28 and the upper cushion 55, and recoil of the body is prevented by the lower pneumatic cushions 59 between the plungers 44 and the bottom heads of the casings. The resiliency of said cushions 55 and 59 may be simultaneously adjusted to vary the spring or shock-absorbing actions of the upper cushions and the recoil action of the lower cushions by means of the screws 58. The shoes 46 at the lower ends of the plunger stems 45 give ample lateral freedom of movement of the body relatively to the chassis so as to permit limited side sway of the body relatively to the chassis under the controlling action of the main and auxiliary springs or cushions.

The body may be readily detached from the chassis by removing the looped clips 31 and unscrewing the nuts 54 from the bolts 50, the body being at this time free to be lifted from the chassis. The stripped chassis may then be used to accommodate any other form of body or load which the chassis is adapted to carry.

The construction described constitutes a very simple and reliable connection between the detachably mounted body and the chassis which enables the vehicle to be readily converted from a pleasure vehicle to a truck, and by replacing the wheels 15 with broad tread or tractor wheels, such as shown in my aforesaid pending application, the vehicle may readily be converted into a tractor for agricultural purposes.

It will be understood that the structural details are capable of some variation within the spirit and scope of the invention, and said invention is not, therefore, limited to the illustrated details except as to those claims wherein said details are specifically set forth.

I claim as my invention:—

1. The combination with an unsprung chassis and a body, of front and rear springs fixed to the body and removably fixed to and bearing upon the chassis, and auxiliary and recoil cushion devices comprising closed topped casings fixed to the body; plungers therein provided with stems which extend downwardly through the bottom heads of the casings, with means to rockingly and detachably fix them to the chassis, and auxiliary and recoil cushioning elements between the plunger and the top and bottom heads of said casings, respectively.

2. The combination with an unsprung chassis and a body, of front and rear springs fixed to the body and removably fixed to and bearing upon the chassis, and auxiliary and recoil cushion devices comprising closed topped casings fixed to the body; plungers therein provided with stems which extend downwardly through the bottom heads of the casings, and formed at their lower ends with shoes which rockingly engage supporting surfaces on the chassis, and auxiliary and recoil cushioning elements within the casings associated with said plungers.

3. The combination with an unsprung chassis and a body, of front and rear springs fixed to the body and removably fixed to and bearing upon the chassis, and auxiliary and recoil cushion devices comprising closed topped casings fixed to the body; plungers therein provided with stems which extend downwardly through the bottom heads of the casings, and formed at their lower ends with shoes which rockingly engage supporting surfaces on the chassis, and auxiliary and recoil cushioning elements within the casings associated with said plungers, with means to adjustably vary the resiliency of the auxiliary and recoil elements.

4. The combination with an unsprung chassis and a body, the former including longitudinal side members, of front and rear semi-elliptic springs fixed to the body and slidingly engaging at their ends the longitudinal members of the chassis, with means to confine the springs therein, and auxiliary spring devices comprising members fixed to the body and other members slidingly engaged therewith and rockingly and detachably fixed to the chassis.

5. The combination with an unsprung chassis and a body, the former including longitudinal side members, of front and rear springs fixed to the body and detachably fixed to the chassis, and auxiliary spring devices comprising casings fixed to the body; plungers slidable therein; stems fixed to the plungers and formed at their lower ends with shoes which are rockingly supported on the chassis, and cushioning elements between the plungers and the upper heads of said casings.

6. The combination with an unsprung chassis and a body, the former including longitudinal side members, of front and rear springs fixed to the body and detachably fixed to the chassis, and auxiliary spring devices comprising casings fixed to the body; plungers slidable therein; stems fixed to the plungers and formed at their lower ends with shoes which are rockingly supported on the chassis, and cushioning elements between the plungers and the upper heads of said casings, with adjusting means to vary the resiliency of said cushioning elements.

7. The combination with an unsprung chassis and a body, the former including longitudinal side members, of front and rear springs fixed to the body and detachably fixed to the chassis, and auxiliary spring devices comprising casings fixed to the body; plungers slidable therein; stems fixed to the plungers and formed at their lower ends with shoes which are rockingly supported on the chassis; means to detachably and loosely fasten the lower ends of said stems to the chassis, and cushioning elements between the plungers and the upper heads of said casings.

8. The combination with an unsprung chassis and a body, the former including longitudinal side members, of front and rear springs fixed to the body and detachably fixed to the chassis and auxiliary spring and recoil devices comprising casings fixed to the body; plungers slidable therein; stems fixed to the plungers and rockingly and detachably engaging at their lower ends the chassis and auxiliary and recoil cushioning elements in said casings between the plungers and the top and bottom heads, respectively, of said casings.

9. The combination with an unsprung chassis and a body, the former including longitudinal side members, of front and rear springs fixed to the body and detachably fixed to the chassis and auxiliary spring and recoil devices comprising casings fixed to the body; plungers slidable therein; stems fixed to the plungers and rockingly and detachably engaging at their lower ends the chassis and auxiliary and recoil cushioning elements in said casings between the plungers and the top and bottom heads, respectively, of said casings, with a single adjusting means for each casing to vary the resiliency of the auxiliary and recoil cushioning elements.

10. The combination with a chassis including longitudinal side members and a body, of front and rear springs fixed to the body and bearing upon and detachably fixed to said side members, and front and rear auxiliary spring devices comprising casings fixed to said body; plungers therein; stems extending downwardly from said plungers and formed at their lower ends to constitute rockers that bear upon the chassis, and means to detachably fix said stems to the chassis.

11. The combination with a chassis including longitudinal side members and a body, of front and rear springs fixed to the body and bearing upon and detachably fixed to said side members, and front and rear auxiliary spring devices comprising casings fixed to said body; plungers therein; stems extending downwardly from said plungers and formed at their lower ends to constitute rockers; brackets extending inwardly from the side members of the chassis upon which the rockers bear, said rockers formed above the brackets with recesses, and bolts anchored in said recesses for detachably fixing said plungers to said brackets.

In testimony whereof, I have hereunto set my hand at Chicago, Illinois, this 12th day of July, 1916.

AUGUST E. MUELLER.

Witnesses:
W. L. HALL,
G. A. SOUTHWELL.

Copies of this patent may be obtained for five cents each, by addressing the "Commissioner of Patents, Washington, D. C."